June 25, 1957 C. W. VAN RANST 2,796,895
LINK SAW CHAIN
Filed May 4, 1953
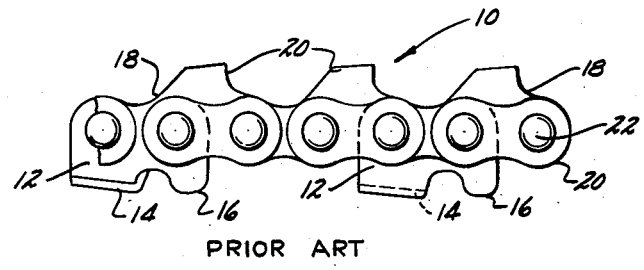
PRIOR ART
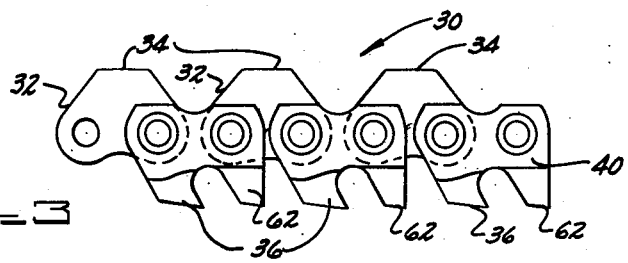
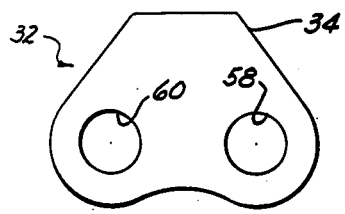
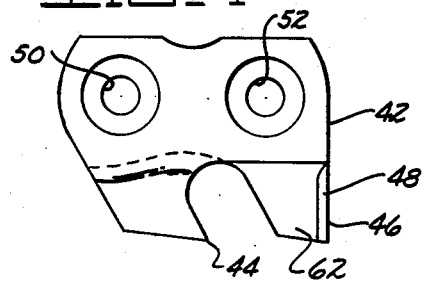
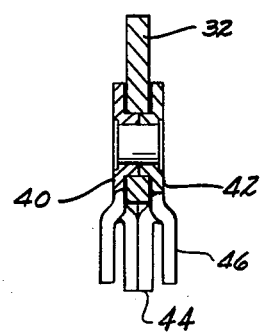
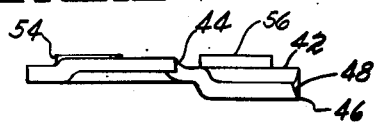
INVENTOR.
CORNELIUS W. VAN RANST
BY Smith and Olsen
ATTORNEYS

United States Patent Office 2,796,895
Patented June 25, 1957

2,796,895
LINK SAW CHAIN

Cornelius W. Van Ranst, Dearborn, Mich.

Application May 4, 1953, Serial No. 352,946

3 Claims. (Cl. 143—135)

The present invention relates to improvement in saw chains, and more particularly to an improved construction and arrangement of the tooth plates and the connecting links in a saw chain.

A basic defect common to nearly all the early prior art saw chains was that the cutting edge, or substantially all thereof, was offset to one side only of the plane of the chain plate on which it was formed. This meant that the load, due to cutting action through the wood, was unbalanced with respect to the plane of the tooth plate, and, due to the level of the cutting edge portion of the tooth, when the edge was sharp the tooth tended to gouge outwardly in the direction of the offset, while, when the edge was dull the tooth was crowded away from the kerf side wall and in the direction opposite to the offset. Thus, with a cutting tooth of a saw chain having the cutting edge portion substantially offset to one side of the plane of the tooth plate it was inherent for the chain to be rough or jerky in operation when sharp and to bind when dull.

In an effort to overcome this problem, efforts were made to provide a saw chain in which the cutting edge of each tooth extended for substantially equal distances on opposite sides of the plane of the tooth plate thereby hoping to balance the tooth load and eliminate outward gouging and inward tearing or jerkiness in operation.

However, the results obtained from such efforts have not been as satisfactory as had been desired. Normally the angularity of the cutting edge has been approximately 45° which has the effect of producing a continuous outward pressure on the cutting tooth. This outward pressure places a continuous strain on the pivot pins and linkages of the chain, and also causes some jerkiness in operation.

It is the principal object of the present invention to provide a saw chain having teeth which are constructed and arranged to eliminate outward pressures from being exerted thereon so that a smooth cutting operation occurs and so that strains caused by twisting of the chain are substantially eliminated.

It is another object of the present invention to provide a saw chain of the foregoing character which has a more efficient arrangement of parts so that a greater number of teeth are available per unit of length thereby permitting a more rapid cutting action of the saw chain.

It is still another object of the present invention to provide a chain saw having an improved construction for joining the cutting teeth and links so that a longer life of the saw chain is assured.

It is still another object of the present invention to provide a saw chain which can be inexpensively manufactured and which has a minimum number of parts which can be stamped from blank stock.

Other objects of this invention will appear in the following description and appended claims, reference being had to the accompanying drawings forming a part of this specification wherein like reference characters designate corresponding parts in the several views.

In the drawings:

Fig. 1 is a fragmentary elevation of one of the conventional prior art types of saw chain;

Fig. 2 is a fragmentary elevation of one embodiment of the present invention;

Fig. 3 is an enlarged elevation of a link adapted for use in the embodiment shown in Fig. 2;

Fig. 4 is an enlarged elevation of a cutting tooth adapted for use in the embodiment shown in Fig. 2;

Fig. 5 is a bottom view of the cutting tooth illustrated in Fig. 4; and

Fig. 6 is an enlarged end view, partly in section, taken in a plane at an angle to the vertical of the embodiment shown in Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a brief description will be given first of the prior art device illustrated in Fig. 1. The chain 10 has a plurality of plates 12 which have hook-shaped cutting teeth 14 and depth gauges 16. The cutting teeth 14 are of alternate right and left configuration. Links 18 having sprocket root portions 20 are disposed between the plates 12. The latter plates 12 and links 18 are connected together by the side plates 20 and pivot pins 22. The cutting teeth 14 have a 45° angularity so that when the chain saw is in operation there will be a tendency to twist the chain in opposite directions at each succeeding cutting tooth 14.

Referring next to Figs. 2 through 6 of the drawings a description of the improvements made over the prior art devices will be given. The saw chain 30 includes the driving links 32 which have sprocket root portions 34 and the cutting elements 36, and they are joined in a manner which will be explained in greater detail hereinafter.

Each cutting element 36 is formed from two oppositely disposed plates 40 and 42 which are the same in shape and size except that one contains the left cutting tooth and the other the right cutting tooth. Only the left plate 42 shown in Figs. 4 and 5 will be described in detail. This plate has a cutting edge 44 which acts in much the same manner as a plane, and a vertical cutting edge 46 which has its one adjacent surface 48 cut back at approximately 45°. However, since the right plate 40 has a symmetrically arranged opposite cutting surface the lateral thrusts exerted on the plates 40 and 42 will be equal and opposite, and hence, there will be no forces tending to twist the chain saw or any of its cutting elements when it is in operation.

In forming the plate 42 by a stamping or similar operation, the apertures 50 and 52 are formed by swaging out the shoulders 54 and 56 which are adapted to be placed into abutting relationship with corresponding shoulders on right plate 40, thereby maintaining the respective plates 40 and 42 in a fixed relationship to one another.

The shoulders 54 and 56 perform another important function. If desired, the saw chain can be assembled by inserting the apertures 58 and 60 of link 32 over their respective associated shoulders of plates 40 and 42, and then the latter can be welded together by an electric butt welding operation. For this purpose a dielectric surface such as insulating varnish will first be applied to the surfaces of the driving link 32 so that it will remain free to pivot about the welded shoulders of the left and right plates 40 and 42. However, if desired conventional pivot pins (not shown) may be used in the apertures of the cutting element 36 in lieu of the welded connection between the abutting shoulders. The abutting shoulder is one of the features of the present invention because it greatly strengthens the saw chain and lengthens its wearing life. The various parts can be hardened by a liquid carburizing process, for example, so that all wearing parts will have a hard, wear-resisting surface.

When the saw chain 30 is in operation, the depth gauge 62 will limit the extent of penetration that can be made by the cutting edges 44 and 46. The cutting edges 44 will dig into the wood causing the saw tooth to pivot in a clockwise direction about the rear pivot. It will be observed that each of the depth gauges 62 will oppose this pivotal action of the saw tooth (see Figs. 2 and 4) and the base of depth gauge 62 will serve as a fulcrum point. If the cutting edge 44 continues to penetrate the wood, there will be the tendency for it to try to pivot in a counterclockwise direction. However, when this occurs the depth gauge will allow only a limited penetration of cutting edge 44, and thereafter the bottom surface of the depth gauge 62 will be inclined upwardly opposing any further penetration. Moreover, there will be no necessity of applying pressure against the saw because the cutting edge 44 will always pull the saw into the workpiece being cut, being limited in its advance only by the depth gauge 62. Thus, the saw chain, in effect, is a self-feeding unit which greatly facilitates using the saw.

Another important feature of the present invention is the increased number of cutting teeth per unit length of saw chain. It can be seen, by referring to Figs. 1 and 2, that there is approximately three times as much effective cutting edge when using the present invention as when using the prior art saw chains. Furthermore, there is no side thrust acting on the cutting elements 36 which will tend to twist the chain or any of its elements.

The present invention also utilizes few parts which reduces the production cost of the saw chain, and by virtue of the sturdy, wear resistant construction of the saw chain it is assured of a long and satisfactory life.

Having described my invention, I claim:

1. In a saw chain, a link cutting element having pivot members in its upper forward and rearward ends for pivotal connection with driving links, said cutting element comprising two symmetrically arranged plates, each having a depth gauge at its forward end and a transverse cutting tooth at its lower rearward end, said cutting teeth being in contact to form a single cutting edge and having flat non-cutting bottom surfaces inclined rearwardly and upwardly at a small angle to a plane containing the axes of the pivot members, said depth gauges being spaced apart so as to be disposed on opposite sides of the intended cutting path of the single cutting edge, said single cutting edge being located below said plane containing the axes of said pivot members, said depth gauges having flat non-cutting bottom surfaces located at no greater distance from said plane than said cutting edge so that during cutting action of the saw chain the forward end of the link cutting element will tend to pivot downwardly and the depth gauges will limit this action, and said depth gauges having side cutting edges substantially normal to said plane, and said bottom surfaces of said depth gauges inclined rearwardly and upwardly toward said plane at a relatively small angle.

2. In a saw chain, a cutting element comprising two symmetrically arranged plates placed in side-by-side relation, each plate having two inwardly extending bosses at its upper forward and rearward ends contacting the corresponding bosses of the other plate so as to provide two shaft-like parts on which associated links of the saw chain can be pivotally connected, each plate having a depth gauge at its forward end and a cutting tooth at its rearward end, said teeth being in contact to form a single cutting edge and having flat non-cutting bottom surfaces inclined rearwardly and upwardly at a small angle to a plane containing the axes of the bosses, said single cutting edge being located below said plane containing the axes of said bosses, said depth gauges having flat non-cutting bottom surfaces located at no greater distance from said plane than said cutting edge so that during cutting action of the saw chain the forward end of the link cutting element will tend to pivot downwardly by operation of the cutting edge and the depth gauges will limit this action, said depth gauges being spaced apart so as to be disposed on opposite sides of the intended cutting path of the single cutting edge and having substantially straight forward edges normal to said plane of the axes, and side cutting edges formed on said straight forward edges of the depth gauges.

3. In a saw chain, a cutting element comprising two symmetrically arranged plates placed in side-by-side relation, each plate having two inwardly extending bosses at its upper forward and rearward ends contacting the corresponding bosses of the other plate so as to provide two shaft-like parts on which associated links of the saw chain can be pivotally connected, the contacting bosses having their abutting ends welded together, each plate having a depth gauge at its forward end and a cutting tooth at its rearward end, said teeth being in contact to form a single cutting edge and having flat non-cutting bottom surfaces inclined rearwardly and upwardly at a small angle to a plane containing the axes of the bosses, said single cutting edge being located below said plane containing the axes of said bosses, said depth gauges having flat non-cutting bottom surfaces located at no greater distance from said plane than said cutting edge so that during cutting action of the saw chain the forward end of the link cutting element will tend to pivot downwardly by operation of the cutting edge and the depth gauges will limit this action, said depth gauges being spaced apart so as to be disposed on opposite sides of the intended cutting path of the single cutting edge and having substantially straight forward edges normal to said plane of the axes, and side cutting edges formed on said depth gauges.

References Cited in the file of this patent

UNITED STATES PATENTS

| | | |
|---|---|---|
| 1,231,190 | Peterson | June 26, 1917 |
| 1,483,387 | Serin | Feb. 12, 1924 |
| 1,979,001 | Kankos | Oct. 30, 1934 |
| 2,446,774 | Mall | Aug. 10, 1948 |
| 2,608,222 | Jensen | Aug. 26, 1952 |

FOREIGN PATENTS

| | | |
|---|---|---|
| 565,089 | Germany | Nov. 25, 1932 |
| 272,660 | Switzerland | Apr. 2, 1951 |